United States Patent [19]

Vevang

[11] 4,124,127

[45] Nov. 7, 1978

[54] MACHINE AND METHOD FOR PALLETIZING CYLINDRICAL ARTICLES

[76] Inventor: Gordon Vevang, 3625 Clubhouse La., Conyers, Ga. 30207

[21] Appl. No.: 776,112

[22] Filed: Mar. 10, 1977

[51] Int. Cl.$^2$ ............................................. B65G 57/28
[52] U.S. Cl. .................................... 214/6 C; 214/6 P
[58] Field of Search .............. 214/6 C, 6 P, 6 H, 6 R, 214/152, DIG. 3, DIG. 4

[56] References Cited

U.S. PATENT DOCUMENTS

| | | | |
|---|---|---|---|
| 1,498,732 | 6/1924 | Jauch | 214/6 C |
| 2,535,880 | 12/1950 | Tomkins | 214/6 C |
| 2,613,824 | 10/1952 | Tallman | 214/6 C |
| 2,765,599 | 10/1956 | Johnson | 214/6 H |
| 2,956,381 | 10/1960 | Chauvin | 214/6 H |
| 2,985,323 | 5/1961 | Wilson et al. | 214/6 C |
| 3,771,671 | 11/1973 | Cathers | 214/6 C |

Primary Examiner—L. J. Paperner
Attorney, Agent, or Firm—Jones, Thomas & Askew

[57] ABSTRACT

A machine and method for palletizing cylindrical articles by which a plurality of cylindrical articles are grouped together in a stack with each cylindrical article oriented horizontally, the formed stack placed aside a vertically oriented pallet, and the pallet brought to a horizontal position and the stack simultaneously uprighted thereon. The machine includes a trough-shaped cradle which is moved downwardly in steps along an inclined path relative to a conveyor on which the cylindrical articles are elevated, for collecting and forming the cylindrical articles into a stack.

4 Claims, 3 Drawing Figures

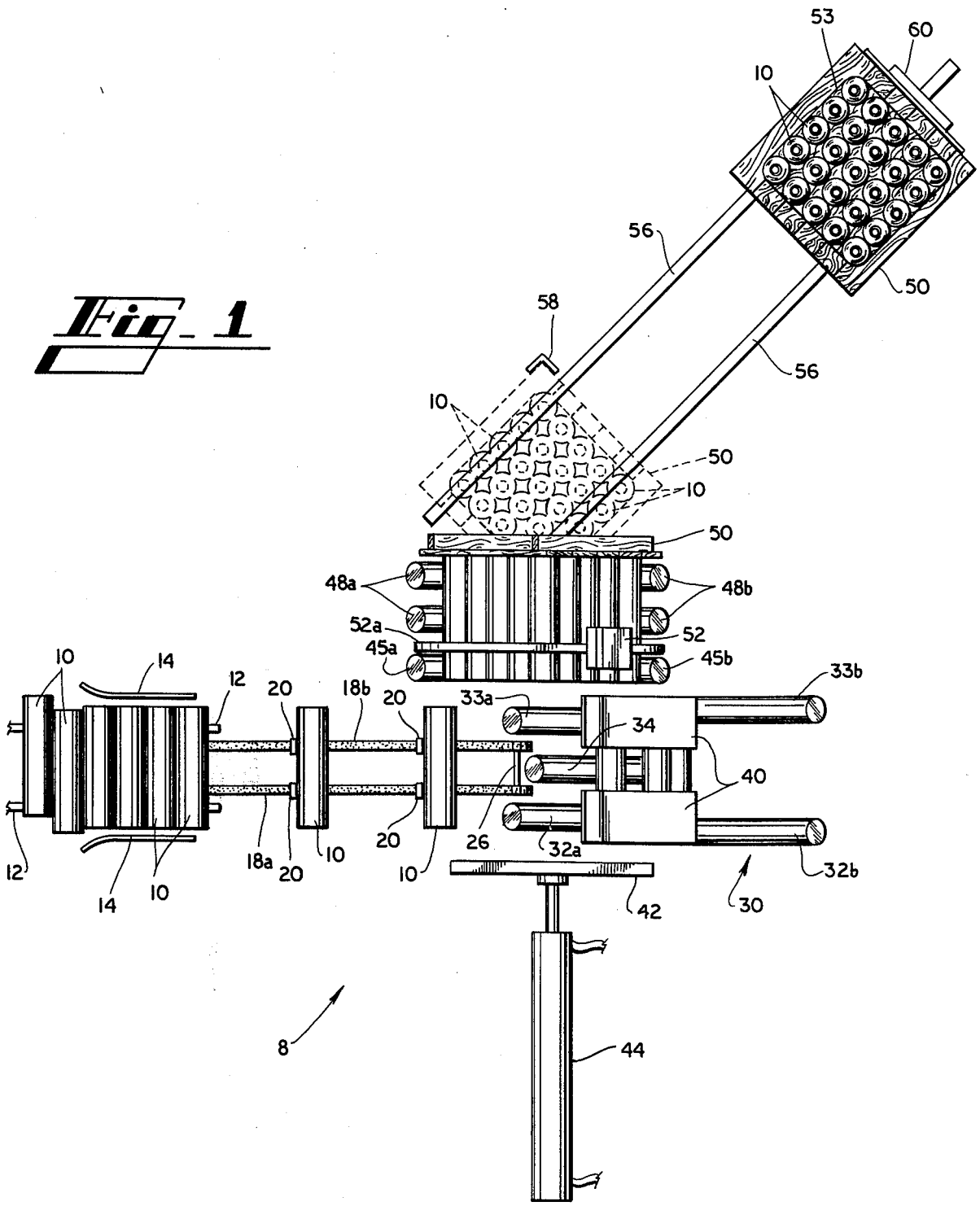
Fig_1

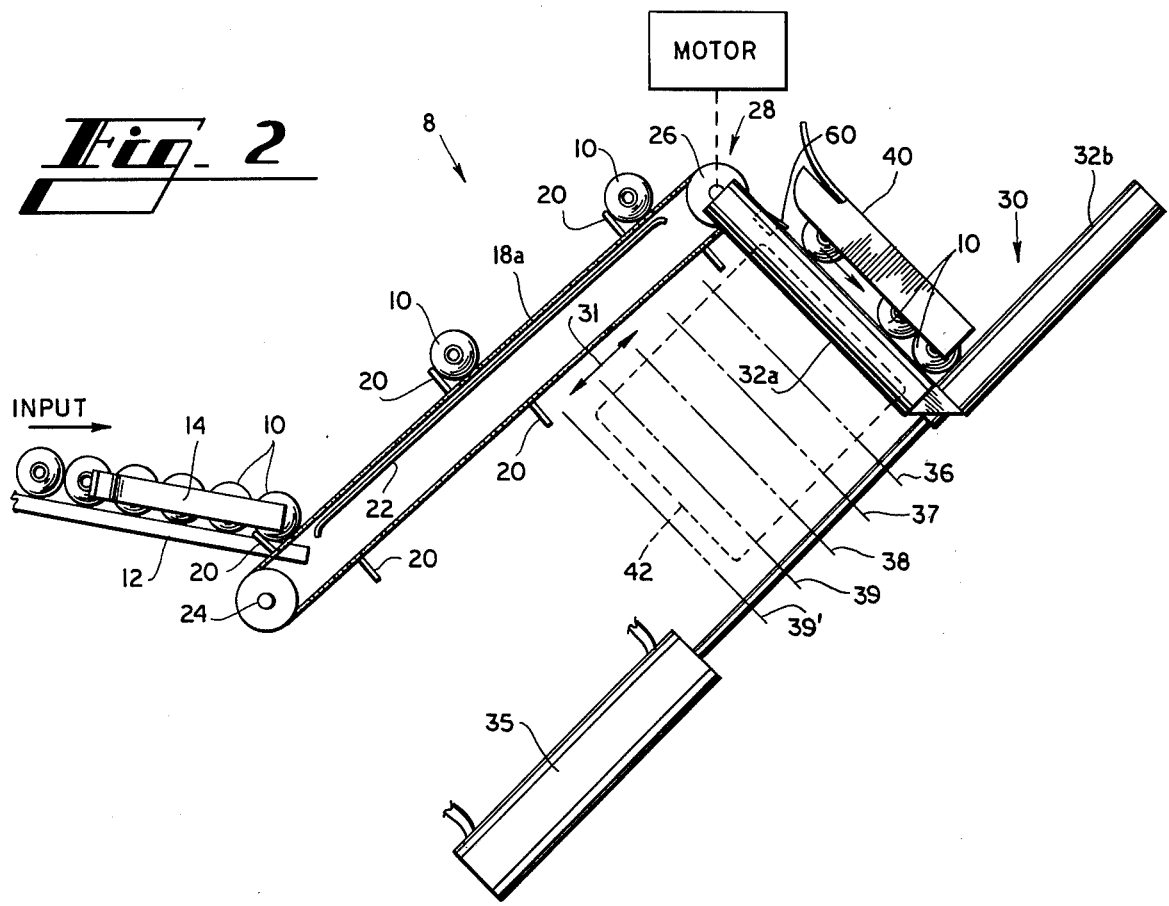
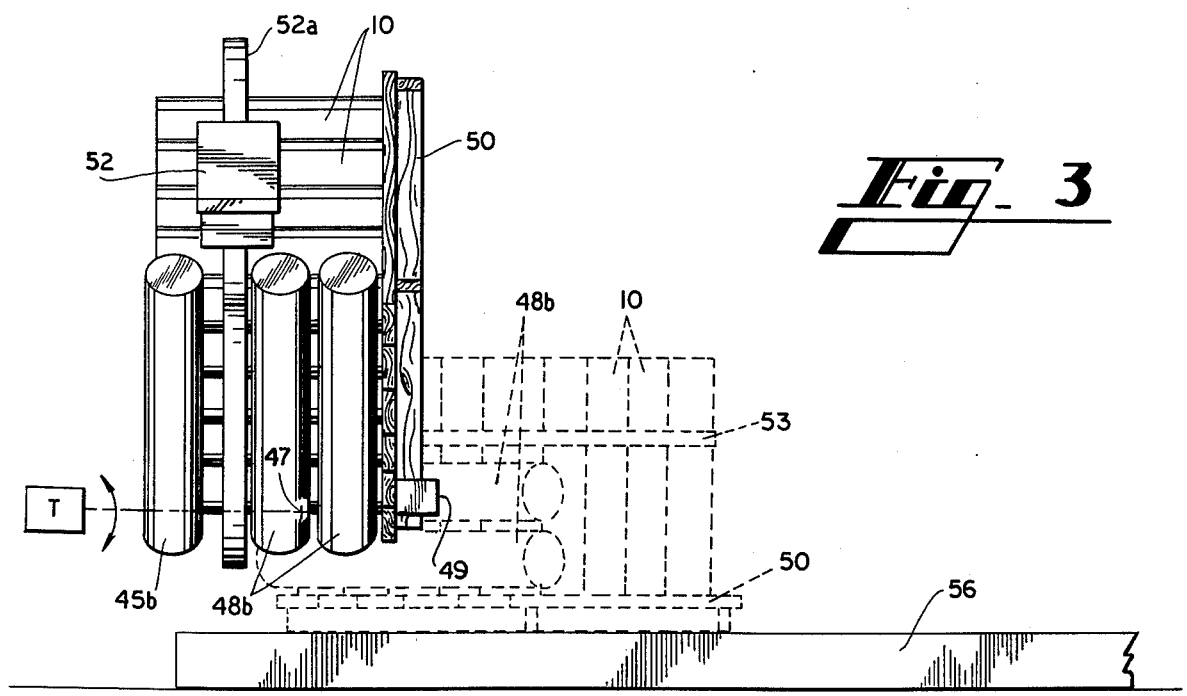

MACHINE AND METHOD FOR PALLETIZING CYLINDRICAL ARTICLES

BACKGROUND OF THE INVENTION

This invention relates generally to machines and methods of loading pallets, and specifically to machines and methods of palletizing cylindrical articles such as rolled sheet material or the like.

As exemplified by the machines shown in U.S. Pat. Nos. 2,977,002, 3,111,233 and 3,844,422, machines have heretofore been developed for loading pallets with various types of articles. Where the load consists only of flat or block shaped articles such as boxes and crates, the palletizing task is relatively simple. In such cases, loading the pallet with efficiency, compactness, and with proper alignment of individual load articles to pallet are the primary concerns.

With cylindrical articles such as rolled sheet roofing material or the like, the problem of palletizing becomes more difficult and has conventionally been accomplished with manual labor. Where the cylindrical articles are loaded in a horizontal configuration they often tend to roll off the pallet. Where the cylindrical articles are loaded in an upright position, they tend to tip and knock over adjacent cylindrical articles during the loading operation. Even when an array of cylindrical articles is successfully loaded onto a pallet, the load possesses little stability.

Accordingly, it is a general object of the present invention to provide an improved machine and method for palletizing cylindrical articles.

More specifically, it is an object of the invention to provide improved means and methods for accumulating a plurality of cylindrical articles and for grouping them together in a stack.

Other objects of the invention are to provide a machine and method for palletizing cylindrical articles with speed, accuracy, operational efficiency and resultant load stability and security.

SUMMARY OF THE INVENTION

In one preferred form of the invention a machine is provided for palletizing cylindrical articles which has means for accumulating a plurality of cylindrical articles and for grouping them together in a stack with each cylindrical article oriented horizontally. The machine also has means for placing an end of the stack formed by adjacent ends of the cylindrical articles aside a vertically oriented pallet. The machine further includes means for bringing the pallet to a horizontal position and concurrently bringing the stack to an upright position with adjacent ends of the cylindrical articles supported upon the pallet.

Stated somewhat more specifically, the apparatus of the present invention comprises conveyor means for sequentially conveying cylindrical articles upwardly along a first incline and for sequentially dumping the articles into cradle means positionable adjacent the top of the first incline. Trough-shaped cradle means are mounted adjacent the conveyor means for receiving cylindrical articles dumped from the conveyor means and for collecting the articles in rows. The apparatus also includes index means for indexing the cradle means downwardly along a second incline aside the first incline in steps as successive rows of cylindrical articles are collected in the cradle means.

In another preferred form of the invention, a method is provided for palletizing cylindrical articles. The method, in general terms, includes the steps of grouping a plurality of cylindrical articles together in a stack with each cylindrical article oriented horizontally, placing an end of the stack formed by adjacent ends of the cylindrical articles aside a generally vertically oriented pallet, and together bringing the pallet to a horizontal position with adjacent ends of the cylindrical articles supported upon the pallet.

Stated in somewhat more specific terms, the method comprises the steps of sequentially conveying individual cylindrical articles to a dump point and there sequentially dumping individual cylindrical articles into a trough-shaped cradle having two inclined support members joined together at an angle. The methed also includes the step of indexing the trough-shaped cradle downwardly along the incline of one of the flat cradle floors in steps as successive rows of cylindrical articles are collected in the cradle.

BRIEF DESCRIPTION OF THE DRAWING

FIG. 1 is a schematic plan view of a machine embodying principles of the invention in one preferred form which may be used in practicing a method of the invention.

FIG. 2 is a schematic front side view of the conveyor and cradle components of the machine shown in FIG. 1.

FIG. 3 is a schematic right side view of the pallet and load reorienting components of the machine shown in FIG. 1.

DESCRIPTION OF THE PREFERRED EMBODIMENTS

Referring now in more detail in the drawing, there is schematically illustrated generally at 8 a machine for palletizing cylindrical articles which articles, in the illustrated example, consists of rolls of roofing material 10. The rolls 10 arrive at the machine 8 by any suitable device, such as the sloping ramp 12 straddled by a jogger 14 which horizontally align the rolls. The ramp 12 terminates adjacent an inclined conveyor comprising a pair of parallel endless conveyor belts 18a and 18b from which a number of spaced-apart lugs 20 project in parallel alignment. A rigid support 22 underlays the belt along a loaded portion of their path of travel to limit belt flexing. The belts 18a and 18b are looped over a lower wheel 24 and over a motor driven upper wheel 26 at a load dump point 28.

A trough-shaped cradle indicated generally at 30 is provided adjacent the upper end of the inclined conveyor, and the cradle is supported for reciprocal movement along an inclined path of travel 31 which is beneath the conveyor and which parallels the conveyor path of travel. The cradle comprises a first pair of idler rollers 32a and 32b mutally supported at a normal angle to define an upwardly-facing V formation. The cradle 30 also comprises a second set of idler rollers 33a and 33b parallel to and laterally spaced apart from the corresponding idler rollers 32a and 32b, and an idler roller 34 which is interpositioned between the idler rollers 32a and 33a. The idler rollers 32a, 33b, 32a, 33b, and 34 are carried by suitable support structure (omitted from the drawing for clairty) which selectably moves the rollers in unison along the inclined path 31 by operation of an actuator as fluid-powered cylinder 35 or the like. At the top of the cradle path 31 the upper surfaces of the idler rollers 32a and 33a are positioned closely adjacent and tangential to the conveyor wheel 26. The actuating cylinder 35 or the like operates to step the cradle 30 downwardly successively from the depicted initial roll-receiving position to the lower roll-receiving positions 36, 37, 38 and 39, and thence to the lowermost position 39', and then to return the cradle to its raised initial position. A pair of upper joggers and top guides 40 is rigidly mounted above the upper most reach of the cradle.

With continued reference to the drawing the palletizing machine is further seen to include a stack push-off plate 42 adapted to be reciprocally driven along a horizontal path by an actuator such as a cylinder 44. A pair of stationary idler rollers 45a and 45b in V formation, best seen in FIG. 1, are located alongside the cradle on the side opposite the push-off plate 42, and two pairs of tiltable idler rollers 48a and 48b, compositely arranged in V-shaped formations, are located alongside and in parallel alignment with the stationary idler rollers 45a and 45b. The stationary idler rollers 45a, 45b and the pairs of tiltable idler rolers 48a and 48b are positioned so that such idler rollers and the idler rollers 32a, 32b, 33a, 33b, and 34 of the cradle 30 are in mutual parallel alignment when the cradle is at its lowermost position 39. A conventional stack banding device 52 having a banding track 52a is located over and between the stationary idler rollers 45a, 45b and the tiltable idler rollers 48a, 48b for placing a band 53 around a stack of articles 10 which are supported on such idler rollers.

The tiltable idler rollers 48a and 48b are mounted on appropriate support structure (omitted from the drawing for clarity) including a tilt control motor T which enables such rollers to be tilted 90° about the axis of rotation 47 between the raised position shown, in solid line in FIG. 3, and the lower position, shown in phantom in FIG. 3. A suitable support 49 is provided to hold a conventional pallet 50 in a vertical position alongside the upright idler rollers 48a, 48b. A gravity conveyor 56 is positioned beneath the lowered position of the tiltable idler rollers. A pallet retaining clamp 58 is provided adjacent the upper end of the gravity conveyor, and a back stop 60 is located adjacent the lower end of the gravity conveyor.

In operation, cylindrical rolls of roofing material 10 are fed down the input ramp 12 through jogger 14 and are sequentially engaged by the lugs 20 of the conveyor belts 18. The rolls are there lifted to the dump point 28 where they are dumped off the conveyor belts and onto the idler rollers 32a, 33a, and 34 of the crade 30, which is positioned at the top of its path of travel. One by one the rolls roll down the idler rollers of the cradle and accumulate into a row, with the leading roll resting at the juncture of the V formed by the cradle idler rollers and with the other rolls resting against each other in succession. When a row consisting of a predetermined number of rolls has been accumulated on the idler rollers 32a, 33a, and 34, an appropriate sensing means such as the last-roll sensing switch 60 signals the cradle actuating cylinder 35 which then steps or indexes the cradle down to position 36. The next roll arriving at the dump point 28 then rolls down over the first row of rolls already accumulated in the cradle, and contacts the cradle idler rollers 32b, 33b. Other rolls follow to form a complete second row in the cradle, whereupon the cradle is again indexed downwardly to position 37. The jogger and top guide 40 assures that the rolls which form each row in the cradle are horizontally aligned. This same procedure is repeated until five rows (for example) have been formed with the cradle now located at position 39.

Once a full stack of rolls in horizontal position has been formed in the cradle 30, the full conveyor is stopped and the cradle is lowered to its lowermost position 39', so that the final row of rolls is lowered beneath the jogger and top guide 40. The cylinder 44 is now actuated to urge push-off plate 42 against the stack of cylindrical rolls 10 supported in the cradle; the plate 42 pushes the stack laterally off the cradle, over the stationary idler rollers 45a and 45b, onto the tilting idler rollers 48a and 48b, and against a vertically oriented pallet 50. The conventional banding device 52 is now operated by means of the band track 52a to place a band 53 snugly around the horizontal stack of rolls. Once banding is completed, the tilt control motor T is actuated and the tiltable idlers along with the banded stack of rolls and the pallet 50 are tilted 90° to the lowered position, as shown in FIG. 3. The pallet 50 is brought to rest atop the gravity conveyor 56 and, upon release of the pallet retaining clamp 58, the loaded pallets slides down the conveyor 56 to backstop 60, thereby completing the operation.

The push-off plate 42 can be returned to its initial position (as shown in FIG. 1) immediately after the stack of rolls has been transferred to the tiltable idlers. The cradle 30 can then be returned to its initial roll-receiving position, so that the roll conveyor can again be operated to commence feeding rolls to the cradle.

It should be understood that the foregoing described embodiment merely illustrates principles of the invention in selected, preferred forms. Many modifications, deletions and additions may, of course, be made thereto without departure from the spirit and scope of the invention as set forth in the following claims.

I claim:

1. Apparatus for accumulating a plurality of cylindrical articles and for grouping them together in a stack comprising, in combination;
   conveyor means for sequentially conveying cylindrical articles upwardly along a first incline and for sequentially dumping the articles into cradle means positionable adjacent the top of said first incline;
   generally trough-shaped first cradle means mounted adjacent said conveyor means for receiving cylindrical articles dumped from said conveyor means and for collecting the articles in rows;
   index means for indexing said cradle means downwardly along a second incline aside said first incline in steps as successive rows of cylindrical articles are collected in said cradle means;
   roller means located alongside said first cradle means and defining a second cradle means which is aligned with said first cradle means when indexed to a lowermost position, so that a collection of rows of articles can be laterally transferred from said first cradle means to said second cradle means;
   means for supporting a pallet aside said collection of articles which is transferred to said second cradle means, said pallet being supported in a generally vertical orientation and in article receiving alignment with said transferred collection of articles; and
   means operative to rotate said second cradle means to position which places said supported pallet in generally horizontal position with said collection of articles vertically supported on the pallet.

2. Apparatus in accordance with claim 1 wherein said index means is adapted to index said cradle means downwardly along a second incline located substantially parallel to said first incline.

3. Apparatus in accordance with claim 1 wherein said generally trough-shaped first cradle means has idler rollers joined on axes of rotation at a substantially normal angle, and said second cradle means includes rollers mounted on axes of rotation at a substantially normal angle.

4. Apparatus as in claim 1, further comprising means disposed adjacent said second cradle means for banding the collection of rows of articles that is transferred to said second cradle means.

* * * * *